United States Patent
Liu et al.

(10) Patent No.: US 9,214,668 B2
(45) Date of Patent: Dec. 15, 2015

(54) SI COMPOSITE ELECTRODE WITH LI METAL DOPING FOR ADVANCED LITHIUM-ION BATTERY

(75) Inventors: Gao Liu, Piedmont, CA (US); Shidi Xun, Pinole, CA (US); Vincent S. Battaglia, San Anselmo, CA (US)

(73) Assignee: The Regents of the University of California, Oakland, CA (US)

( * ) Notice: Subject to any disclaimer, the term of this patent is extended or adjusted under 35 U.S.C. 154(b) by 200 days.

(21) Appl. No.: 13/700,681

(22) PCT Filed: May 27, 2011

(86) PCT No.: PCT/US2011/038420
§ 371 (c)(1),
(2), (4) Date: Mar. 13, 2013

(87) PCT Pub. No.: WO2011/153105
PCT Pub. Date: Dec. 8, 2011

(65) Prior Publication Data
US 2013/0260239 A1    Oct. 3, 2013

Related U.S. Application Data

(60) Provisional application No. 61/350,870, filed on Jun. 2, 2010, provisional application No. 61/391,029, filed on Oct. 7, 2010.

(51) Int. Cl.
*H01M 4/134* (2010.01)
*H01M 4/62* (2006.01)
*H01M 4/04* (2006.01)
*H01M 4/1395* (2010.01)
*H01M 10/052* (2010.01)
*H01M 4/66* (2006.01)

(52) U.S. Cl.
CPC ............ *H01M 4/134* (2013.01); *H01M 4/0402* (2013.01); *H01M 4/1395* (2013.01); *H01M 4/621* (2013.01); *H01M 4/622* (2013.01); *H01M 4/624* (2013.01); *H01M 4/626* (2013.01); *H01M 10/052* (2013.01); *H01M 4/661* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,423,447 B1* | 7/2002 | Ohsaki et al. | 429/217 |
| 2002/0086211 A1* | 7/2002 | Umeno et al. | 429/231.4 |
| 2002/0119373 A1* | 8/2002 | Gao et al. | 429/218.1 |
| 2004/0131880 A1* | 7/2004 | Zheng et al. | 428/690 |
| 2006/0127773 A1* | 6/2006 | Kawakami et al. | 429/245 |
| 2007/0059600 A1* | 3/2007 | Kim et al. | 429/217 |
| 2008/0274408 A1* | 11/2008 | Jarvis | 429/231.95 |
| 2010/0099018 A1* | 4/2010 | Kawase et al. | 429/105 |

* cited by examiner

*Primary Examiner* — Ula C Ruddock
*Assistant Examiner* — Daniel Gatewood
(74) *Attorney, Agent, or Firm* — Lawrence Berkeley National Laboratory

(57) ABSTRACT

A silicon electrode is described, formed by combining silicon powder, a conductive binder, and SLMP™ powder from FMC Corporation to make a hybrid electrode system, useful in lithium-ion batteries. In one embodiment the binder is a conductive polymer such as described in PCT Published Application WO 2010/135248 A1.

15 Claims, 6 Drawing Sheets

SI COMPOSITE ELECTRODE WITH LI METAL DOPING FOR ADVANCED LITHIUM-ION BATTERY

CROSS REFERENCE TO RELATED CASES

This application claims priority to PCT Application PCT/US2011/038420, filed May 27, 2011, which in turn claims priority to U.S. Provisional Patent Application No. 61/391,029, filed Oct. 7, 2010, entitled Si Composite electrode with Li Metal Doping for Advance Lithium-ion Battery, and U.S. Provisional Patent Application 61/350,870, filed Jun. 2, 2010, entitled Si Composite electrode with Li Metal doping for Advanced Lithium-ion Battery, both of which earlier filed applications are incorporated herein by reference as if fully set forth in their entirety. This application is also related to copending PCT Application PCT/US2010/035120, filed May 17, 2010, entitled Electrically Conductive Polymer Binder for Lithium-ion Battery Electrode, now published PCT Application WO 2010/135248 A1.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

FIELD OF THE INVENTION

This invention relates generally to lithium ion rechargeable batteries, and more specifically to a novel combination of ingredients for the making of a lithium ion negative electrode.

BACKGROUND OF THE INVENTION

Lithium-ion rechargeable batteries have been developed for hybrid electric vehicle (HEV) and plug in HEV applications by several battery suppliers in the US. However, there are still significant challenges to develop lithium-ion batteries to meet the high energy density requirements for EV applications. Silicon has demonstrated high gravimetric density (3579 mAh/g at $Li_{1.5}Si_4$), almost 10 times higher than graphite anode materials (372 mAh/g). High energy density Si based anode material has the potential to fulfill the energy density requirements for EV applications, when combined with high voltage or high capacity cathode materials. However, Si anode materials tend to have lower first cycle coulombic efficiency compared to graphite materials. The smaller the Si particle size, the larger the first cycle irreversible capacity. The first cycle efficiency may be as low as 50% for nanosize Si materials. Lithium ions are consumed during first lithiation to form surface coatings on Si, leading to a shortage of cycleable lithium in the cell. This lithium shortage can cause shift of electrode potentials during cell operation, resulting in fast fading of the entire cell system.

It has recently been proposed to use FMC Corporation's proprietary stabilized lithium metal powder (SLMP™) to increase the lithium content of battery electrodes by either surface application or slurry application, as described in the FMC single page bulletin (Appendix) entitled "For More Charge Use Li, For Maximum Charge Use FMC's SLMP Technology". See also the FMC one page article entitled "Incorporation of Stabilized Lithium Metal Powder (SLMP™) into High Energy Li-ion Batteries", Li, et al., and U.S. Pat. Nos. 5,567,474; 5,776,369; 5,976,403; 6,706,447; and 7,276,324.

SUMMARY OF THE INVENTION

This invention provides a means for compensating for first cycle lithium loss in lithium-ion batteries by using stabilized lithium metal powder (SLMP) as an additive in the Si anode electrode. In one embodiment three materials are combined to make a lithium-ion negative electrode: Si/SLMP/conductive binder. In one embodiment, the conductive binder can be that as described in copending published PCT Application PCT/US2010/035120, now PCT Publication WO 2010/135248, which application is incorporated herein by reference as if fully set forth in its entirety.

In that copending PCT application, a new class of binder materials was described for use in the fabrication of silicon containing electrodes. This new binder material, which becomes conductive on first charge, provides improved binding force to the Si surface to help maintain good electronic connectivity throughout the electrode, and thus promote the flow of current through the electrode. Electrodes made with these binders were shown to significantly improve the cycling capability of Si, due in part to their elasticity and ability to bind with the silicon particles used in the fabrication of the electrode.

This novel class of conductive polymers useful as conductive binders included poly 9,9-dioctylfluorene and 9-fluorenone copolymer. These polyfluorene polymers, used as an anode binder in the lithium ion battery provide both mechanical binding and electric pathways. Further, by modifying the side chain of the polyfluorene conductive polymer with functional groups such as —COOH, bonding with the Si nano crystals significantly improved.

Illustrative of the conductive polymer binder of the PCT application is the polymeric composition of the following formula, having one or more of the repeating units:

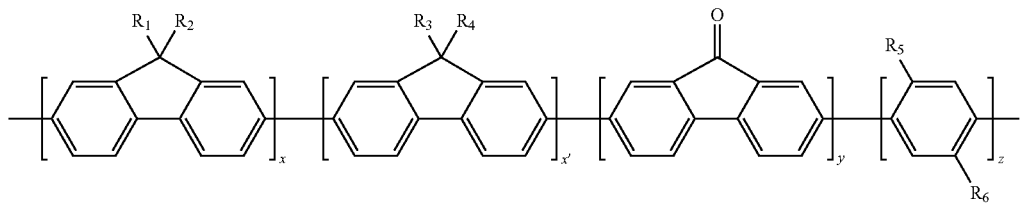

wherein $0 \leq x$, x', y and $z \leq 1$, $x+x'+y+z=1$, $R_1$ and $R_2$ is $(CH_2)_nCH_3$ where n=0-8, $R_3$ and $R_4$ is $(CH_2)_nCOOH$ where n=0-8, and $R_5$ and $R_6$ is any combination of H, COOH and $COOCH_3$.

SLMP and Si are both powders, the powders mixed with the conductive polymer binder in an organic solvent to form a slurry. The slurry is then cast onto copper strips and dried to form the laminate electrode. In a first embodiment, a so-called "low loading" electrode, there is a lower ratio of SLMP in the laminate (See FIG. 2, top row of images). In the low loaded SLMP electrode, the SLMP is used to compensate for the Si first cycle loss of lithium. In a second embodiment, the so-called "high loading" electrode, there is a higher ratio of SLMP in the laminate (See FIG. 2, bottom row of images). In the high SLMP loading electrode, the SLMP is used to fully lithiate the Si materials in the electrode.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

By way of this invention, a silicon electrode is formed by combining silicon powder with a conductive polymer as described in the above referenced PCT application and SLMP powder to make a hybrid electrode system.

In one embodiment, the conductive polymer binder as described in the referenced PCT application is combined with nano Si powder and SLMP. In one embodiment a small amount of SLMP is used in the Si composited or on the surface of the Si composite electrodes, this embodiment otherwise known as low loading. The amount used is limited to be just enough to compensate for the first cycle loss of lithium ion (See FIG. 3).

In yet another embodiment, a large amount of SLMP is used in the formation of the Si composite electrode, otherwise known as high loading. The SLMP is added in the slurry making process. When a large amount of SLMP is used as an additive in the Si composite electrode, the electrode is fully lithiated at the beginning of the cell life (See FIG. 4). This electrode can accordingly be coupled with a positive electrode that does not contain lithium ion. For example, such an electrode can be used to couple with high capacity positive electrode materials such as $V_2O_5$ or low cost $Mn_2O$ materials.

Exemplary of a low loading of SLMP, the ratios of Si/SLMP/Binder can be 2/1.44/1 by weight. Exemplary of a high loading, the Si/SLMP/Binder ratio can be 2/7/1 by weight.

To prepare the silicon electrodes of the invention, a powder of silicon is first dispersed in a suitable organic solvent, and a measured amount of SLMP and a polymer binder, such as the conductive polymer binder described above, then added. The resulting slurry is then easily spread onto an underlying copper current collector and allowed to dry to form the SLMP loaded silicon electrode. For best results, SLMP of uniform particle size and smaller size are preferred.

Figure 1:
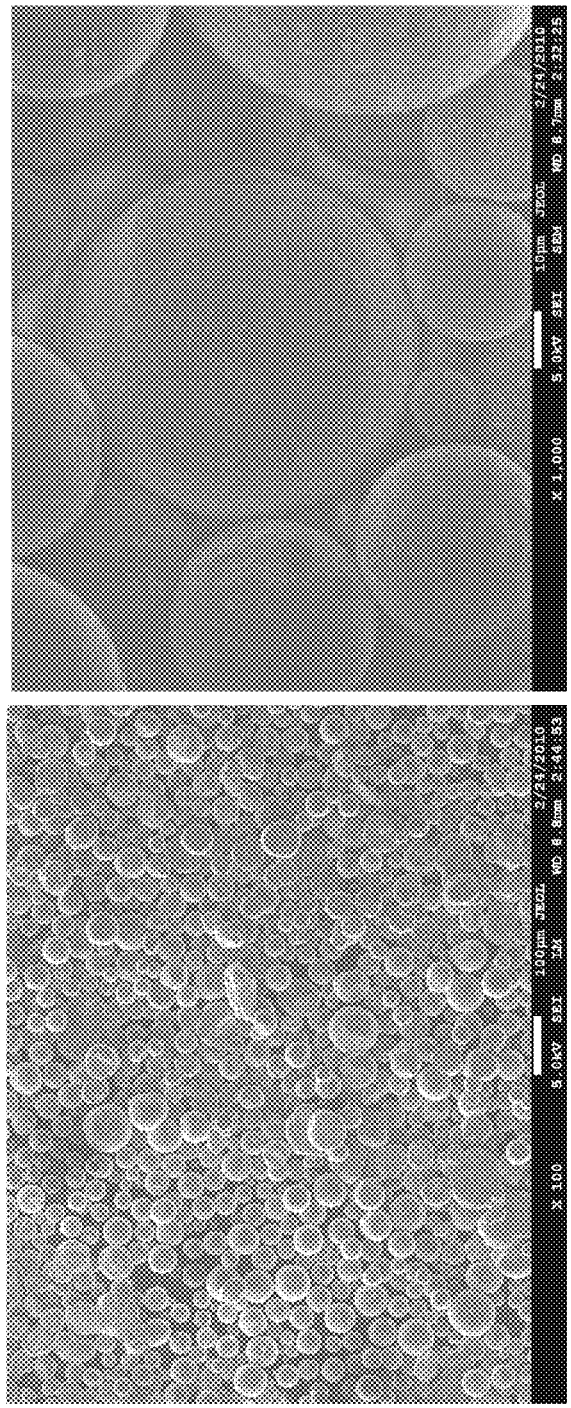
FIG. 1 contains SEM images of "as purchased" SLMP.

The SEM images of the FMC SLMP (FIG. 1) were taken at the Lawrence Berkeley National Laboratory. Average particle size is around 75 microns with a large size distribution. Some particles are smaller than 10 micron, and some larger than 100 micron.

Figure 2:
FIG. 2 contains SEM images of both low and high SLMP loadings of an Si/Li/Binder electrode.
Figure 2:
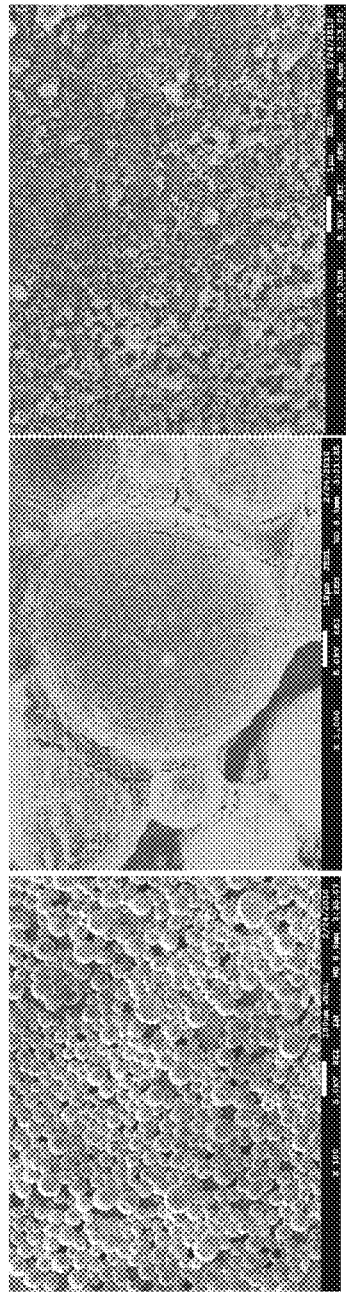

FIG. 2 contains SEM images of electrodes made with the conductive polymer of the referenced PCT application, silicon powder and FMC's SLMP. Two types of electrode were made, a low loading of SLMP and high loading of SLMP. In the low loading electrode, where the ratio of Si/Li/Binder is 2/1.44/1 by weight (Li=SLMP), the distribution of SLMP is not very uniform based on the SEM images. In the high loading electrode, where the ratio of Si/Li/Binder is 2/7/1 by weight, the polymer/Si composite is coated on the surface of the SLMP particles. The high loading electrode either fully or over lithiates the Si in the electrode.

Figure 3:
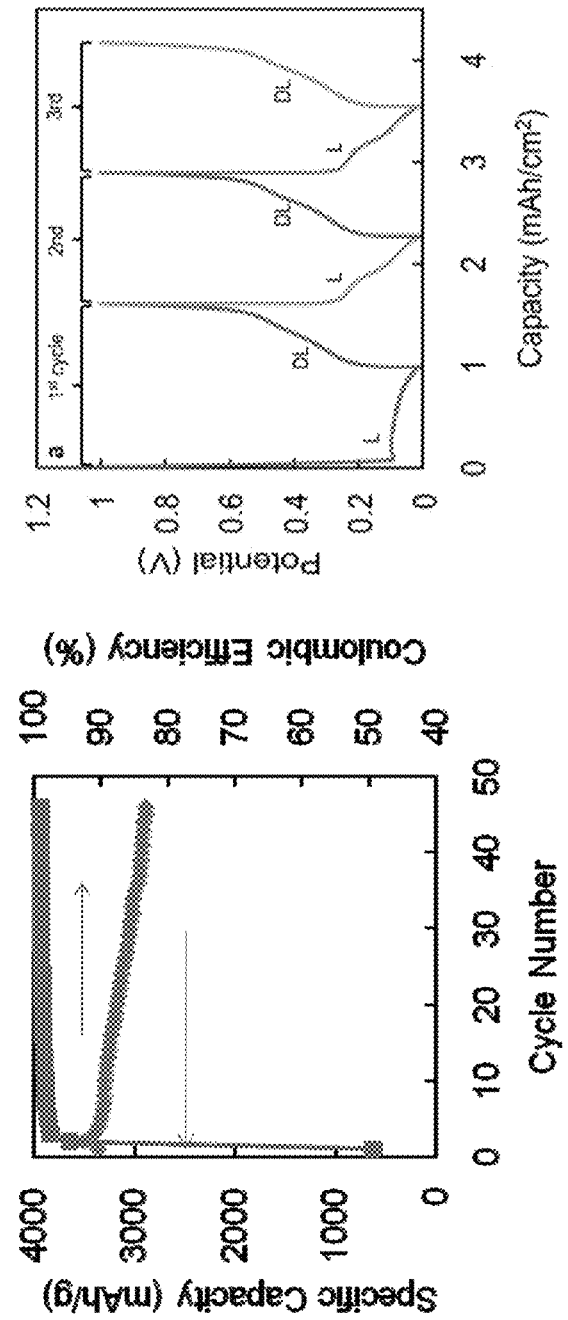
FIG. 3 includes a plot of cycle number vs. specific capacity, and a plot of capacity vs. potential for a low loaded SLMP containing electrode.

The low loading electrode performance is presented in FIG. 3. In this experiment the SLMP did not improve the first cycle loss of lithium in the Si electrode as was originally expected. The potential-capacity chart is the same as that for a Si electrode that does not contain SLMP.

Figure 4:
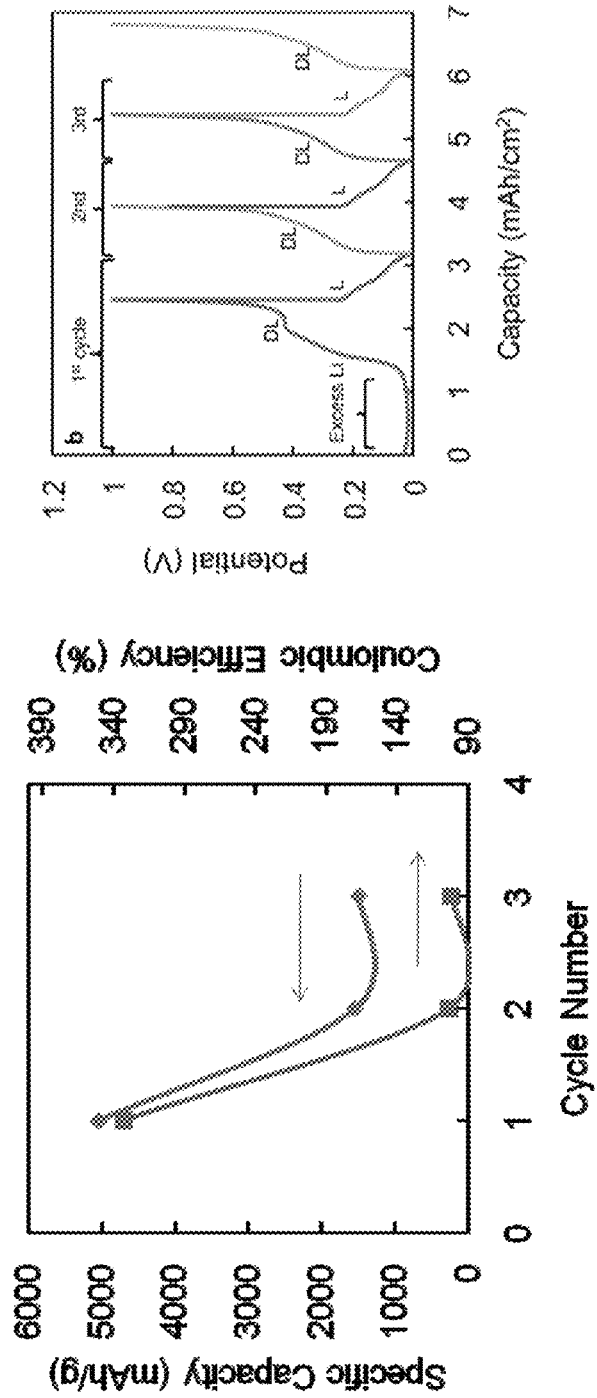
FIG. 4 includes a plot of cycle number vs. specific capacity, and a plot of capacity vs. potential for a high loaded SLMP containing electrode.

The high loading electrode performance is presented in FIG. 4. The electrode was lithiated during the cell assembly process. Unlike conventional Si electrodes, this composite electrode starts with delithiation. However, when the SLMP content is too high and presents excess SLMP in the electrode, during the first hour of the $1^{st}$ cycle, with lithium being removed, the potential is very low.

Figure 5:
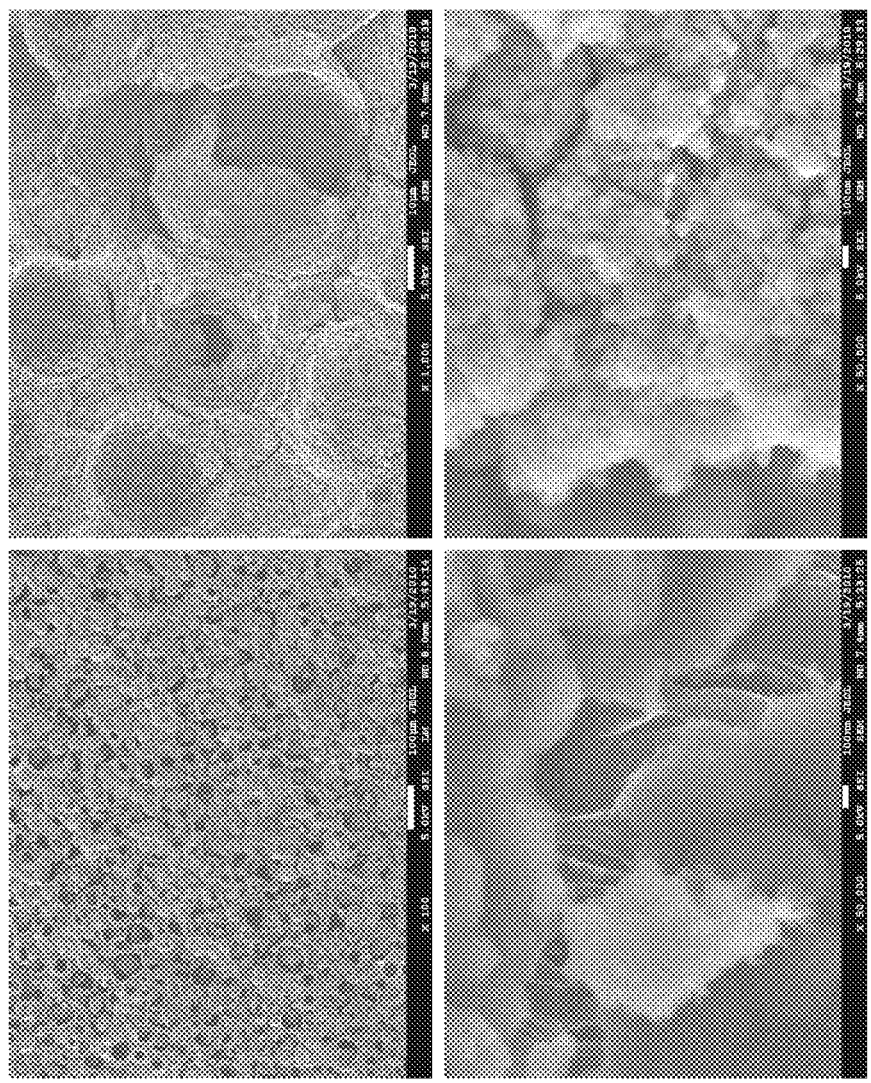
FIG. 5 contains SEM images at different magnifications of a Si electrode with SLMP after three cycles.

With reference to FIG. 5, these are SEM images of the cycled high loaded SLMP electrode. After 3 cycles, the cell was dissembled, and the electrode washed and investigated under SEM. The lithium had migrated out of the SLMP after cycling. However, the shape of the SLMP is still retained in the electrode. A sponge shape microstructure electrode was formed. This electrode structure is preferred for Si electrodes, as large pores help to mitigate the stress created by volume change during lithium insertion and removal from the Si.

Figure 6:
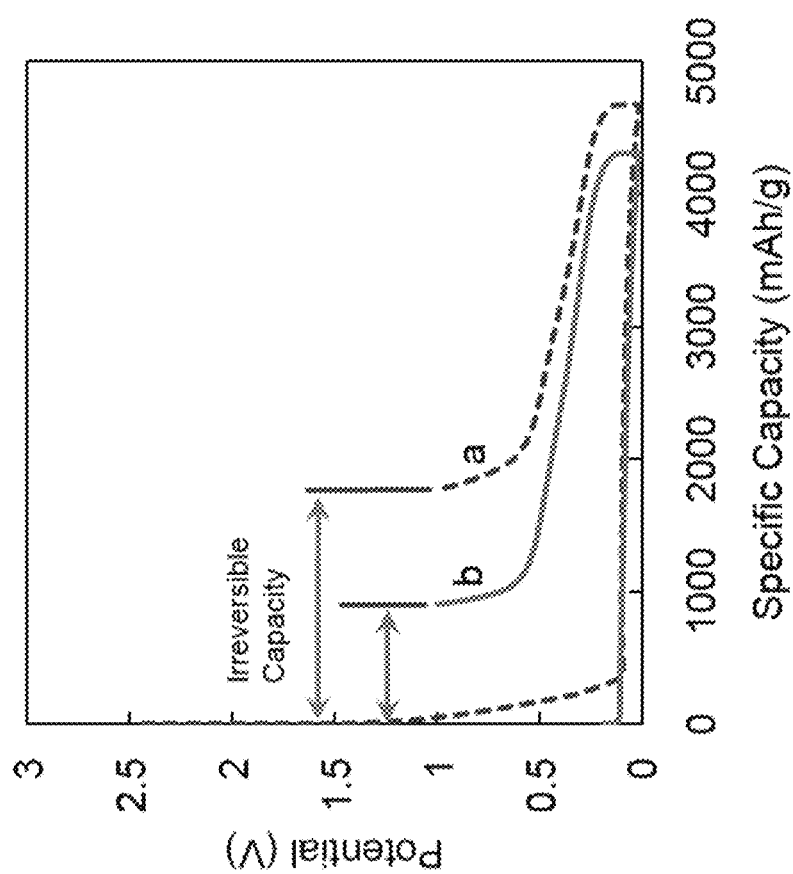
FIG. 6 is a plot of specific capacity vs. potential for first cycle performance of Si electrodes against a lithium metal counter electrode, both without (curve a) and with (curve b) SLMP as an additive.

With reference to FIG. 6, shown is the initial performance of Si electrodes cycled against a lithium metal counter electrode. In FIG. 2a, a conventional nano-Si particle based electrode, typical 60% of first cycle coulombic efficiency is shown. In FIG. 2b, initial cycling of Si electrode in combination with SLMP, the first cycle irreversible capacity is limited to approximately 20%.

In addition to the use of SLMP to improve the first cycle performance of the silicon electrode, it has been found that the exposed silicon surface of the electrode can be further improved by adding a fluorinated carbonate to the battery electrolyte. In one embodiment, the carbonate may be ethylene carbonate. In another embodiment, the carbonate can be selected from other, higher order alkylene carbonates, or for example vinylene carbonate. The carbonate, upon coming into contact with the exposed surface of the silicon electrode forms a thin stabilizing layer.

It has also been proposed by others to use tin as an electrode material for the negative electrode in lithium ion batteries. In yet another embodiment of this invention, when tin is used in the form of nanoparticles to form the negative electrode, the addition of SLMP to the tin nanoparticles in the formation process can likewise be effective to improve the performance of the electrode.

The Si/conductive polymer binder/SLMP composite of this invention has a very unique structure to address some of the most critical issues for high energy negative electrode systems. This approach circumvents the issue of dendrite formation during lithium metal cycling. The lithium metal is used in the system, but cycling is only performed between the positive material and the silicon. This approach also enables the use of a large category of high energy cathode materials that do not contain lithium ion at the initial stage. Further, the first cycle loss of lithium is compensated for. Finally, the migration of lithium ion from the SLMP sphere to the Si creates sponge like structures in the electrode that are critical to release the stress created by Si volume expansion. In this regard, it is preferred to use smaller sized SLMP particles in the range of 5-10 microns in diameter.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A composition of matter comprising:
an active electrode material selected from the group comprising silicon, or tin;
a conductive binder; and,
a stabilized lithium metal powder, wherein the conductive binder comprises a polymeric composition having repeating units of the formula:

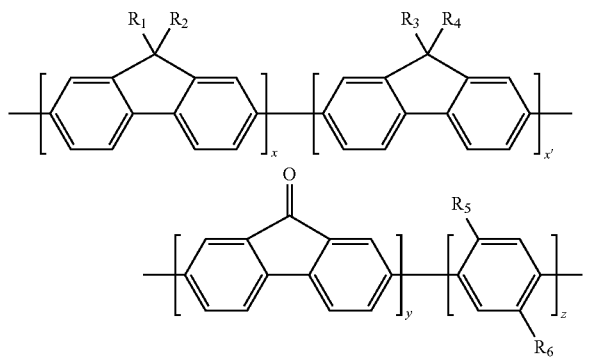

wherein $0<x, x', y$ and $z<1$, $x+x'+y+z=1$, $R_1$ and $R_2$ is $(CH_2)_n CH_3$ where $n=0-8$, $R_3$ and $R_4$ is $(CH_2)_n COOH$ where $n=0-8$, and $R_5$ and $R_6$ is any combination of H, COOH and COOCH$_3$.

2. The composition of matter of claim 1 wherein the composition is deposited onto a copper foil.

3. The composition of matter of claim 2 wherein the composition is deposited onto the copper foil to form a film laminate.

4. The composition of matter of claim 3 wherein an exposed side of said film laminate includes a carbonate stabilizer.

5. The composition of matter of claim 4 wherein the carbonate stabilizer is ethylene carbonate.

6. The composition of matter of claim 4 wherein said carbonate stabilizer is an alkylene carbonate.

7. The composition of matter of claim 6 where said carbonate stabilizer is a vinylene carbonate.

8. The composition of matter of claim 1 where the active electrode material is silicon.

9. The composition of matter of claim 1 wherein the ratio of silicon/SLMP/conductive binder is 2/7/1 by weight.

10. An electrode for use in a lithium-ion battery including the composition of matter of claim 1.

11. A lithium ion battery having a negative electrode, wherein said electrode comprises a laminate of the composition of matter of claim 1 in combination with a current collector.

12. The lithium ion battery of claim 11 wherein the laminate comprises a copper foil current collector in electrical contact with a covering layer of the composition of matter of claim 1.

13. A method of forming the laminate of claim 12 wherein silicon in powder form is combined with SLMP in powder form and the conductive binder, the three components mixed in an organic solvent to form a slurry, the slurry then deposited onto the copper foil current collector, followed by drying.

14. The method of claim 13 wherein, after formation, the exposed surface of the laminate is brought into contact with an alkylene carbonate to further stabilize the exposed surface.

15. The method of claim 14 wherein the carbonate is added to the electrolyte of the lithium ion battery to bring it into contact with the exposed surface of the laminate.

* * * * *